United States Patent
Müller (10) Patent No.: US 7,207,236 B2
(45) Date of Patent: Apr. 24, 2007

(54) SAFETY DEVICE FOR A MOTOR VEHICLE WITH A STEERING COLUMN ARRANGEMENT AND SAFETY METHOD

(75) Inventor: Olaf Müller, Rüsselsheim (DE)

(73) Assignee: Thyssenkrupp Presta AG, Eschen (LI)

( * ) Notice: Subject to any disclaimer, the term of this patent is extended or adjusted under 35 U.S.C. 154(b) by 0 days.

(21) Appl. No.: 11/079,803

(22) Filed: Mar. 14, 2005

(65) Prior Publication Data

US 2005/0160862 A1   Jul. 28, 2005

Related U.S. Application Data

(63) Continuation of application No. 10/634,728, filed on Aug. 5, 2003, now Pat. No. 6,923,086, which is a continuation of application No. PCT/DE01/04873, filed on Dec. 20, 2001.

(30) Foreign Application Priority Data

Feb. 6, 2001   (DE)   .......................... 201 01 928 U
Mar. 30, 2001  (WO)   ...................... PCT/DE01/01216

(51) Int. Cl.
    *B62D 1/18*   (2006.01)
(52) U.S. Cl. ........................ 74/493; 280/777
(58) Field of Classification Search ............... 74/492, 74/493, 495; 280/775, 777
    See application file for complete search history.

(56) References Cited

U.S. PATENT DOCUMENTS

| 4,507,982 | A |   | 4/1985  | Turner et al. |         |
|-----------|---|---|---------|---------------|---------|
| 4,656,888 | A |   | 4/1987  | Schmitz       |         |
| 5,477,744 | A | * | 12/1995 | Hoblingre et al. | 74/493 |
| 5,606,891 | A | * | 3/1997  | Tisell et al. | 74/493  |
| 5,829,310 | A |   | 11/1998 | DePaolis      |         |
| 5,979,265 | A |   | 11/1999 | Kim et al.    |         |
| 6,095,012 | A |   | 8/2000  | Lutz          |         |
| 6,543,807 | B2| * | 4/2003  | Fujiu et al.  | 280/775 |

FOREIGN PATENT DOCUMENTS

| EP | 0 019 571    | 11/1980 |
|----|--------------|---------|
| EP | 0 865 980 A1 | 9/1998  |
| EP | 0 941 909 A1 | 9/1999  |
| GB | 2 306 629    | 5/1997  |

* cited by examiner

*Primary Examiner*—David M. Fenstermacher
(74) *Attorney, Agent, or Firm*—Martin Fleit; Paul D. Bianco; Fleit Kain Gibbons Gutman Bongini & Bianco, P.L.

(57) ABSTRACT

A safety device is provided for a motor vehicle with a steering column arrangement having length and height adjustment. The length adjustment contains a slot guidance, which runs linearly in the longitudinal direction of the steering column arrangement, and an engagement mechanism cooperates therewith. The height adjustment contains a swiveling mechanism used for the length adjustment. Moreover, the length adjustment is carried out by the slot guidance and an engagement mechanism guided therein. The height adjustment is carried out by swiveling a steering column arrangement by means of a swiveling mechanism that engages with the engagement mechanism.

23 Claims, 9 Drawing Sheets

SAFETY DEVICE FOR A MOTOR VEHICLE WITH A STEERING COLUMN ARRANGEMENT AND SAFETY METHOD

RELATED APPLICATION

This application is a continuation of U.S. application Ser. No. 10/634,728, filed Aug. 5, 2003, which issued as U.S. Pat. No. 6,923,086 on Aug. 2, 2005, which is a continuation of International PCT application Ser. No. PCT/DE01/04873 filed Dec. 20, 2001, the contents of which are here incorporated by reference in their entirety.

BACKGROUND OF THE INVENTION

1. Field of the Invention

The invention relates in general to a safety device for a vehicle with a steering column arrangement, as well as, to a safety method; such safety devices and methods in general serve to reduce the risk of injuries and injuries to drivers.

2. Prior Art

To adjust the position of a steering column or in general steering column arrangements in the height and length directions, it is conventional in industrial practice to attach laterally next to the steering column clamping metal sheets with adjustment slots in the horizontal and vertical directions. Conventionally a straight clamping bolt is inserted through these clamping slots, which bolt clamps the clamping metal sheets to each other by means of a clamping lever(s) and clamping lugs to shorten its length, so that they sufficiently secure the steering column even during a crash. These adjustment metal sheets with the clamping bolt and its clamping mechanism, in the practice of the known state of the art, project downward over the steering tube or column in such a manner that they can become a dangerous 'knee injurer' during a crash. It is also not possible to place this mechanism upside down pointing 'upward' because the tachometer and the other instruments are usually located there.

In other steering column arrangements with adjustable position, which are known in practice, the mechanical steering column length and height adjustments conventionally consist of plate packets which are connected by clamping bolts and led in slots. The plate packets conventionally consist of two different plate types. One plate type has slots for length adjustment of the steering column. These are attached to the steering column housing. The second plate type has slots which are perpendicular to it. These plates are rigidly attached to a base plate, which in turn is screwed to the vehicle. Within the length of the slots, any position of the steering column is possible. Conventionally, on the central bolt, a clamping device is mounted which either releases or applies tension to the plate packets by means of threadings or lugs. The plates can also be strips which can be swiveled, for example, according to PCT WO 97/16337.

All these mechanisms have the problems in that they extend by a few centimeters beyond the steering column housing simply because the adjustment length requires this. These projecting plates constitute a significant risk of injury in the case of a crash or an accident.

SUMMARY OF THE INVENTION

Thus, the purpose is to improve the existing protection for a driver during an accident. In particular, the purpose of the invention is to provide such a safety device and such a safety method for a vehicle with a steering column arrangement, so as to largely protect the leg area of a driver during an accident.

According to the invention, this is achieved by means of a safety device, as well as, a safety method as will be explained herein. Additional preferred and advantageous embodiments of the invention can be obtained from the dependent claims and their combinations as well as from the following description of preferred and advantageous, as well as concrete, embodiment examples of the invention represented in the drawings, where generalizations which fall within the scope of the knowledge of a person skilled in the art must also be included as part of the disclosure content and the technical teaching of the present documents.

In the safety device for a motor vehicle with a steering column arrangement as well as with length adjustment devices and height adjustment devices for said column arrangement, where the length adjustment devices contain a slot guidance which runs linearly in the longitudinal direction of the steering column arrangement and contains engagement devices which are led therein, the invention provides that the height adjustment devices contain swiveling devices which engage in the engagement devices of the length adjustment devices.

It is preferred for the swiveling devices to contain at least one swiveling lever that engages with one end to the engagement devices of the length adjustment devices and with its other end to the vehicle, in particular a base plate, which is connected to the motor vehicle, by an articulation that can be swiveled.

As an alternative, or in addition, one can provide for the swiveling devices to contain stabilization. It is preferred for the stabilization to present at least one guide lever which engages with one end to the engagement devices of the length adjustment devices and with its other end to the vehicle, in particular a base plate, which is connected to the motor vehicle, by means of an articulation which can be swiveled, and each guide lever and/or optionally each swiveling lever contains a length compensation.

For the fixation of a setting position of the steering column arrangement, it is preferred to provide clamping devices that engage with the engagement devices of the length adjustment devices. Advantageously, the clamping devices contain a multitude of clamping plates, which can be actuated via the engagement devices of the length adjustment devices, because this allows the generation of a particularly high clamping force. In individual combination with a multitude of swiveling levers and/or a multitude of guide levers the individual levers are each received at their corresponding ends between the clamping plates so that when a setting position of the steering column arrangement is clamped by means of the clamping plates via the engagement devices of the length adjustment devices, both the latter and the swiveling levers and optionally the guide levers and thus the height adjustment devices are fixed. Furthermore, it is preferred for the clamping devices to contain holding devices which, with regard to the engagement devices, can be actuated to operate the clamping devices where the holding devices contain, in particular, screws, screw threadings, nuts, levers and/or lugs. Furthermore, it is possible for the clamping devices to contain a multitude of clamping plates and at least one clamping piece associated with them, which clamping piece is designed in such a manner that it overlaps with the clamping plates as well as optionally with the swiveling levers and/or guide levers, to achieve a clamping effect; in this context, finally, it is preferred for the clamping piece to be designed with a slight curvature of preferably at least hundredths of a millimeter in such a manner that the greatest clamping force can be applied therewith at the ends or end areas.

According to the invention, it is preferred, furthermore, with the safety device, that the slot guidance contain guidance slots, on both sides of the steering column arrangement, which run linearly in the longitudinal direction of the latter, and that the engagement devices which are led therein be formed from an engagement part which is located on only one side of the steering column arrangement. Here, because of the small space requirement which can be achieved therewith, it is particularly advantageous for the engagement part to present a middle section adapted to the external contour of the steering column arrangement and engagement ends, and which are located next to the steering column arrangement. As an alternative, or in addition, it is preferred to provide for engagement devices which do not project downward with respect to the position of the steering column arrangement in the motor vehicle, over the steering column arrangement, and in particular, to provide for leading them over the steering column arrangement and around it, where the engagement devices are, in particular, led at most around the upper half of the steering column arrangement. In connection with the above explained clamping devices it is, furthermore, preferred for the engagement devices to be capable of being swiveled to actuate the clamping devices. Furthermore, in the context of the invention, it is advantageous to provide for engagement devices which can be swiveled by at most approximately 60°, in particular by approximately 45°, and preferably by approximately by 30°, and, particularly advantageously, by approximately half of each of the preceding from a middle position in both directions. A particularly preferred embodiment of this aspect of the invention consists in the engagement part being formed from a bolt that contains bendings by means of which it is led around the steering column arrangement, where the bolt, in particular, has a circular cross section.

Furthermore, in the invention it is preferred for the length adjustment devices to be carried along in the case of a height adjustment of the steering column arrangement.

Moreover, in the context of the invention, the length adjustment devices and height adjustment devices are located on one side, or particularly on both sides, laterally next to the steering column arrangement.

Furthermore, it is preferred for the slot guidance of the length adjustment devices to present at least a guidance slot which is formed in an adjustment plate.

For the comfort of the operator, it is particularly advantageous if load removal devices are arranged in such a manner that the weight of the steering column arrangement is at least partially compensated. Advantageously, the load removal devices contain a flat spiral spring, which acts between the motor vehicle and the steering column arrangement. It is preferred to achieve this by an effective arrangement of the flat spiral spring on the swiveling devices, on the one hand, and on a base plate, on the other hand, with which the swiveling devices engage.

The purpose of the invention is also reached by such a safety method for a motor vehicle with a length and height adjustable steering column arrangement, where the length adjustment is carried out by means of a slot guidance, which runs linearly in the longitudinal direction of the steering column arrangement, and by engagement devices which are led therein, and where the height adjustment is carried out by a swiveling of the steering column arrangement by means of swiveling devices which engage with the engagement devices of the length adjustment devices.

BRIEF DESCRIPTION OF THE DRAWINGS

The invention is further explained below with reference to exemplary embodiment examples and the drawing, in which.

DETAILED DESCRIPTION OF PREFERRED EMBODIMENTS OF THE INVENTION

The same reference numerals in the individual figures and representations of the drawings denote identical or similar components, or components with identical or similar structure and function. With reference to the representations in the drawing, characteristics, which are not provided with reference numerals, are also shown, irrespective of whether such characteristics are described below or not. On the other hand, characteristics, which are contained in the present description, but not visible or represented in the drawing, are also immediately understandable for a person skilled in the art.

The invention is further explained below with reference to the embodiment examples represented in the drawings, without being limited to them.

Figure 1:
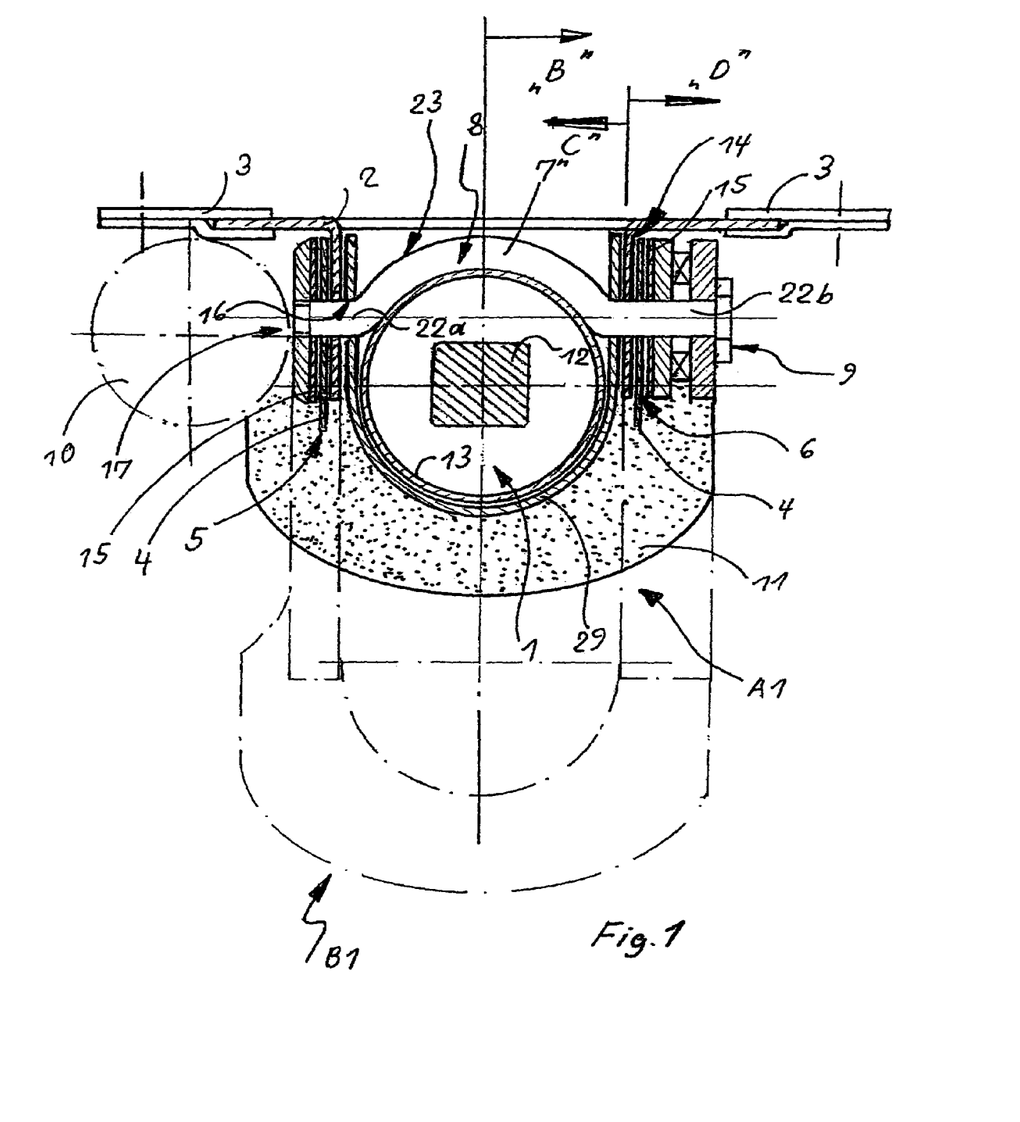
FIG. 1 shows a first embodiment example of the safety device in a schematic cross sectional view in two height setting positions.
Figures 2, 3:
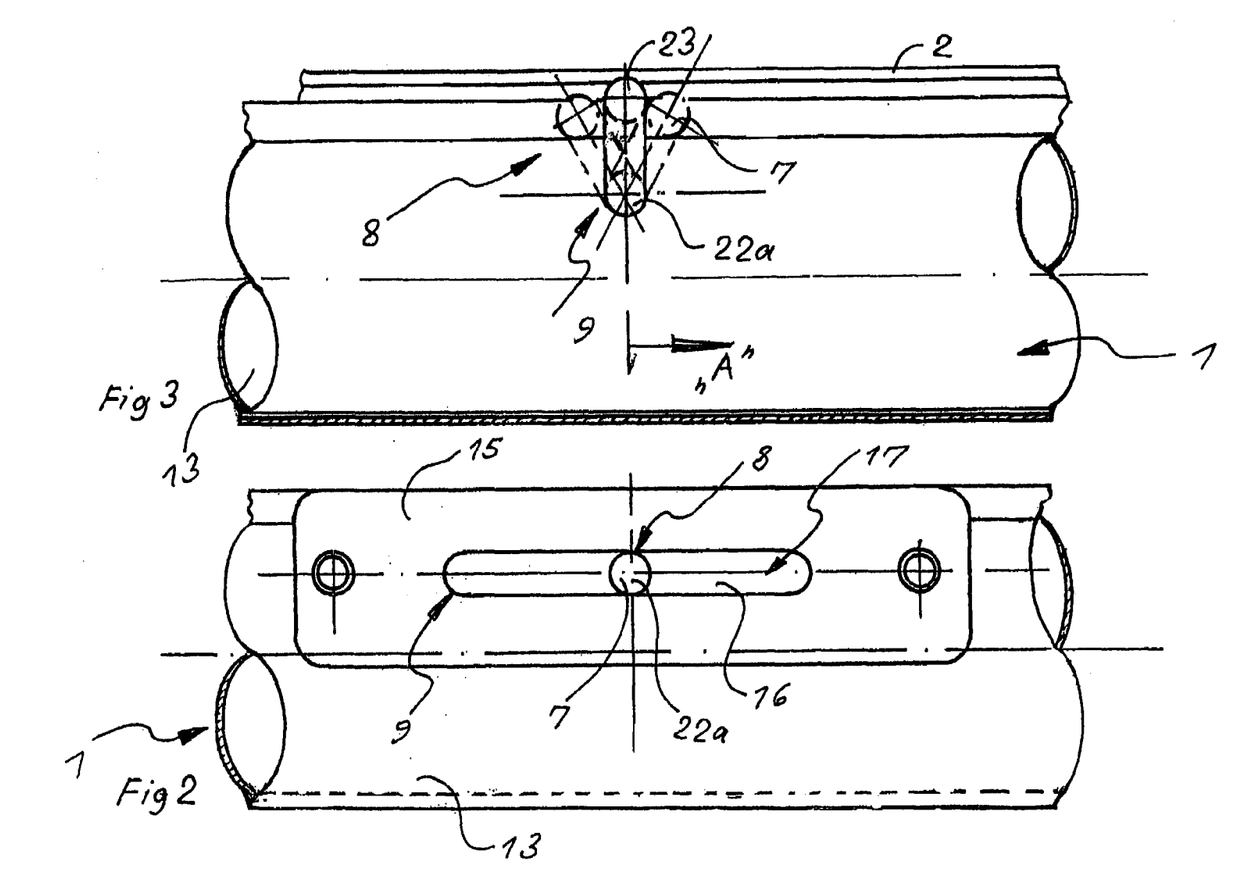
FIG. 2 shows a schematic view of a section of the steering wheel column with the safety device of the first embodiment example according to cross section "C" in FIG. 1.
FIG. 3 shows a schematic view of a section of the steering wheel column with the safety device of the first embodiment example to clarify a clamp actuation according to cross section "D" in FIG. 1.

FIGS. 1 and 2 show, in cross section or in a side view, a steering column arrangement 1 which is suspended on a base plate 2, such as, for example, a sliding metal sheet. The base plate 2 is fixed to guides 3 connected to a body (not shown) of a motor vehicle (not shown). On the side of the steering column arrangement 1 or in general any steering [arrangement], swiveling levers 4 are attached by means of an articulation, and they are a component of the swiveling devices 5 which in turn are part of the height adjustment devices 6. A bolt, which, according to the invention, is shaped to match the steering contour, as an engagement part 7, constitutes a saving in space as a result of its shape and it represents engagement devices 8 of length adjustment devices 9.

Furthermore, in FIG. 1, a space 10 for receiving a pyrotechnic adjustment cylinder (not shown) is suggested, by means of which, in the case of an accident, the steering column arrangement 1 can be moved away from a driver, and which adjustment cylinder is as described in the prior applications DE 198 44 412.5 and PCT/DE 99/01000 of the present applicant, to which entire documents reference is made here to prevent mere repetitions, so that, the entire disclosure contents of these older applications is hereby accepted in the present documents. Reference numeral 11 denotes a collision padding, which covers the steering column arrangement 1 in the direction toward the legs of a driver. The steering shaft of the steering column arrangement 1 bears the reference numeral 12. The steering column arrangement 1 also contains a steering column 13. The position of the steering column arrangement 1 in its upper position A1 is represented with full lines and the position of the steering column arrangement 1 in its lower position B1 is represented with dash-dot lines.

Furthermore, in FIG. 1, clamping devices 14 are represented which, on both sides of the steering column arrangement 1, contain a multitude of clamping plates 15, which are arranged laterally on the steering column arrangement 1 and between which, in each case, swiveling levers 4 with their corresponding end areas are received. FIG. 2 clearly shows a guidance slot 16 of a guide 17 which is a component of the length adjustment devices 9.

FIG. 3 schematically shows how the bolt 7 of the engagement device 8, instead of turning as in the conventional use of straight bolts, swivels by approximately 30° or 45–60° in order to effect an actuation of the clamping devices 14. Furthermore, an exemplary drawing is given in FIG. 3, because it is also valid for FIGS. 2 and 4, of the section "A" in order to clarify the connection with the view given in FIG. 1.

Figure 4:
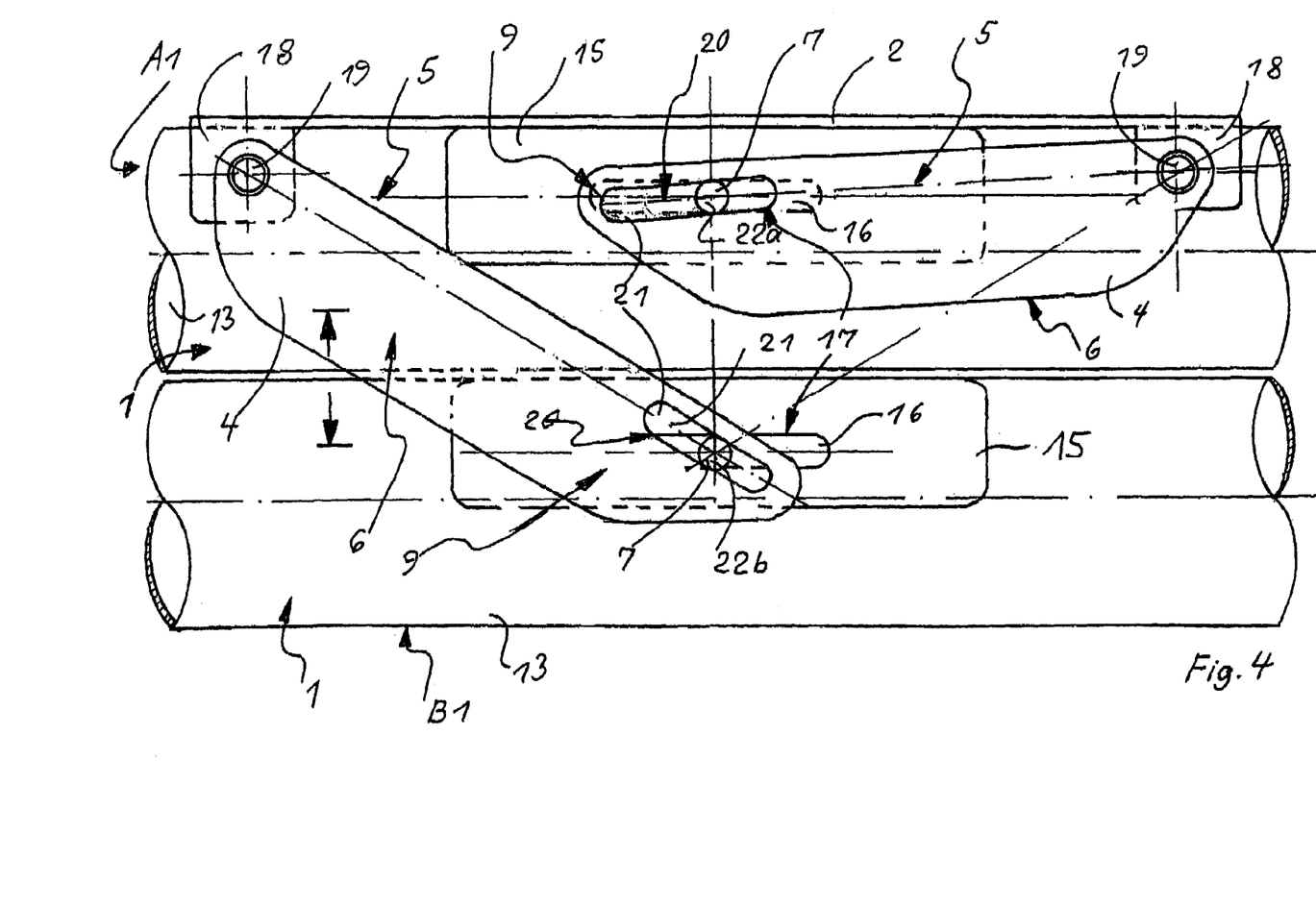
FIG. 4 shows a schematic view of a section of the steering column arrangement with the safety device of the first embodiment example in two height setting positions, but in each case, from another side, according to cross section "B" in FIG. 1.

FIG. 4 schematically shows, in each case, the upper position A1 of the steering column arrangement 1 from one side and the lower position B1 of the steering column arrangement 1 from the other side, clarifying the function and the arrangement of the swiveling levers 4. The latter are attached in a manner so they can be swiveled on support blocks 18 by means of support bolts 19 on the metal sheet slide or on the base plate 2, and they are braced, in the overlapping area with the clamping bolt or general bolt 7. The swiveling levers 4, of which a multitude can be provided on each side of the steering column arrangement 1, and which serve the function of height adjustment, as well as the clamping metal sheets or plates 15 for the vertical or length adjustment, are also provided on each side, possibly in a multiple number, are provided with alternate nesting, so that a good clamping force is generated allowing even a sufficient hold during a crash. Moreover, in each swiveling lever 4, a length compensation 20 in the form of a longitudinal hole 21 is shown, in which the respective end area 22a or 22b of the bolt 7 is received. The length compensation 20 allows, for example, also a rectilinear guidance of the steering column arrangement 1 in a height adjustment, instead of a guidance along an arc, as would be the case, if there were no length compensation 20, that is, the end areas 22a and 22b would be received in normal reamed holes (not shown) in the corresponding end areas of the swiveling levers 4. However, the latter is also possible as a construction variant.

Furthermore, FIG. 1 shows that the bolt 7 between its two end areas 22a and 22b presents a middle section 23 which is led in the shape of an arc around the cross section of the steering column arrangement 1 on its top side. The bolt 7 is thus offset in a manner of speaking between its two end areas 22a and 22b. As a result, in the end areas 22a and 22b of the bolt 7, sufficient space is produced below the base plate 2 to accommodate the length adjustment devices 9, the height adjustment devices 6 and the clamping devices 14, without the formation of a special construction height for this purpose. The bolt 7 or, more precisely, its middle section 23 is here located between the base plate 2 and the steering column arrangement 1, that is, above the latter with reference to the motor vehicle (not shown). By means of this shape and arrangement of the bolt 7, which can also be replaced by any other part having a similar shape, as long as it fulfils the function which can be understood by a person skilled in the art without any problem, on the one hand, and the design of the setting devices, on the other hand, namely the length adjustment devices 9 with the slot guidance 17, and separately therefrom, the height adjustment device 6 with the swiveling levers 4, it can advantageously be achieved that no parts of these adjustment devices project downward under the steering column arrangement 1 and by this present a danger for the legs of a driver. Nevertheless, it is possible to achieve a problem free and good adjustability of the arrangement and position of the steering column arrangement 1.

Figure 5:
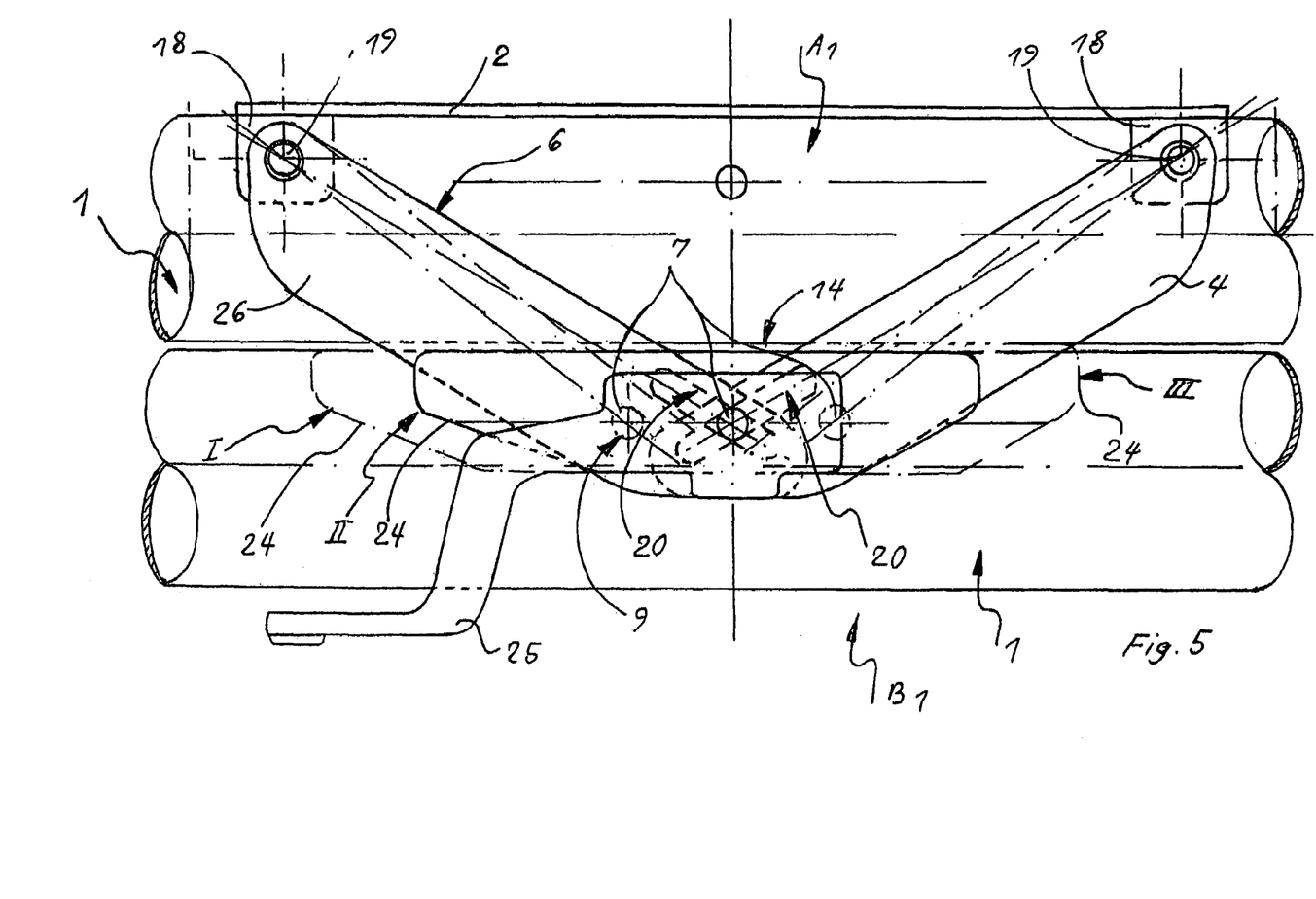
FIG. 5 shows a schematic side view of a section of the steering column arrangement with the safety device of the first embodiment example in two height setting positions with a variant of the clamping devices.

FIG. 5 also shows the upper and lower position A1 and B1, respectively, of the steering column arrangement 1 and, in addition, a clamping piece 24 in a front, a middle and a back horizontal or longitudinal position I, II or III. Because of the lever ratios and the forces introduced thereby, the clamping piece 24 is as long as possible. Furthermore, the clamping piece 24 is slightly curved in such a manner that it transfers force above all at the ends (advantageous lever ratios). Moreover, FIG. 5 shows height adjustment devices 6, length adjustment devices 9 as well as clamping devices 14, and, for the latter, a clamping lever 25, by means of which one can achieve, for example, a swiveling of the bolt 7 which is further described above in connection with FIG. 3, and other holding devices (not shown) can also be actuated, which in turn serve for loosening and tightening the clamping devices 14. Additional parts, characteristics and functions are analogous to those which have been described above in connection with other figures, so that a mere repetition can be omitted here.

As an additional special feature, a guide lever 26 is shown in FIG. 5, which, like the swiveling lever 4 is part of the height adjustment devices 6 and serves for the stabilization of the latter. As already explained with reference to the swiveling lever 4, it is also possible in each case to provide a multitude of guide levers 26 on each side of the steering column arrangement 1, and to incorporate them in the individual end areas alternately with the clamping plates 15 and the corresponding end areas of the swiveling lever 4 in the clamping devices 14. In the embodiment example which is shown here, not only the swiveling levers 4, but also the guide levers 26 in the end areas which are coupled to the bolts 7, each present a length compensation 20, by means of which a more free movement path during the height adjustment can be achieved.

Figure 6:
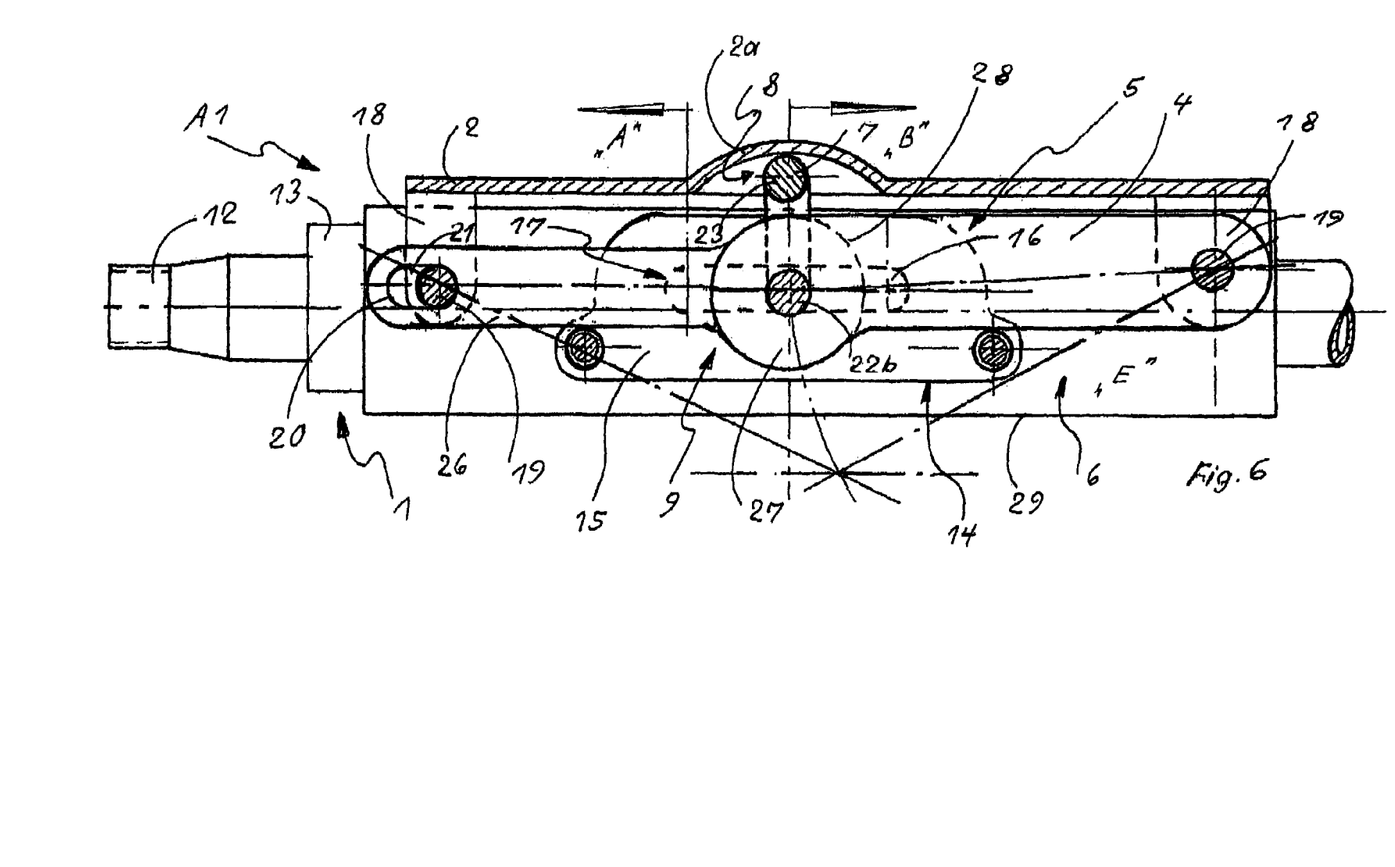
FIG. 6 shows a partially cut schematic side view of a second embodiment example of the safety device with the steering column arrangement in an upper position.

FIG. 6 schematically shows a steering column arrangement or a steering column assembly 1 in its uppermost position A1, positioned parallel to a base plate 2 to clarify an additional embodiment possibility of the safety device according to the invention. To the extent that individual characteristics, components and/or functions have already been explained in connection with FIGS. 1–5, a repeated written presentation for FIG. 6 and the additional figures is largely omitted and reference is made to the description which has already been made. Additional details can also be obtained, in particular, from the comparative consideration of the already explained figures with the subsequently treated figures, in particular with the aid of the reference numerals.

On the steering column arrangement 1 in FIG. 6, a packet of clamping metal sheets or plates 15 which belong to the clamping devices 14 is connected in a manner which is known to a person skilled in the art. On the base plate 2 at the four corners two support blocks 18 are applied on the steering side and two support blocks 18 are attached on the motor side. Swiveling arms or levers 4 are bolted by one of their ends by support bolts 19 to each of the support blocks 18 on the motor side. The swiveling arms 4 end at the other end in as large as possible a circular surface area 27, through whose middle the end areas 22a, 22b of the bolt 7 of the engagement devices 8 of the length adjustment devices 9 are inserted. This swiveling arm 4 can swivel about the support bolt 19. The swiveling arms or levers 4 thus only have fixed holes for swiveling and no length compensation 20, on the support block 18 or with the bolt 7. As already mentioned above, a packet of swiveling levers 4 can be provided on each side of the steering column arrangement 1, each being parallel, to increase the stability.

Opposite the support block 18 on the steering side, a packet of support or guide levers 26 is bolted by means of support bolts 19 to one end. The other end also ends in a large circular surface area 28, through whose middle the end areas 22a, 22b of the bolt 7 of the engagement devices 8 of the length adjustment devices 9 are also inserted. The support arm or lever 26 stabilizes the height setting or adjustment mechanisms or devices 6 to form a triangle and, in the depicted case, it presents, on its end located on the side of the support block, a relatively short length compensation 20, which, however, could also be provided at the other end or at both ends, or, as an alternative or additionally, in one end or in both ends of the swiveling levers 4.

Figure 7:
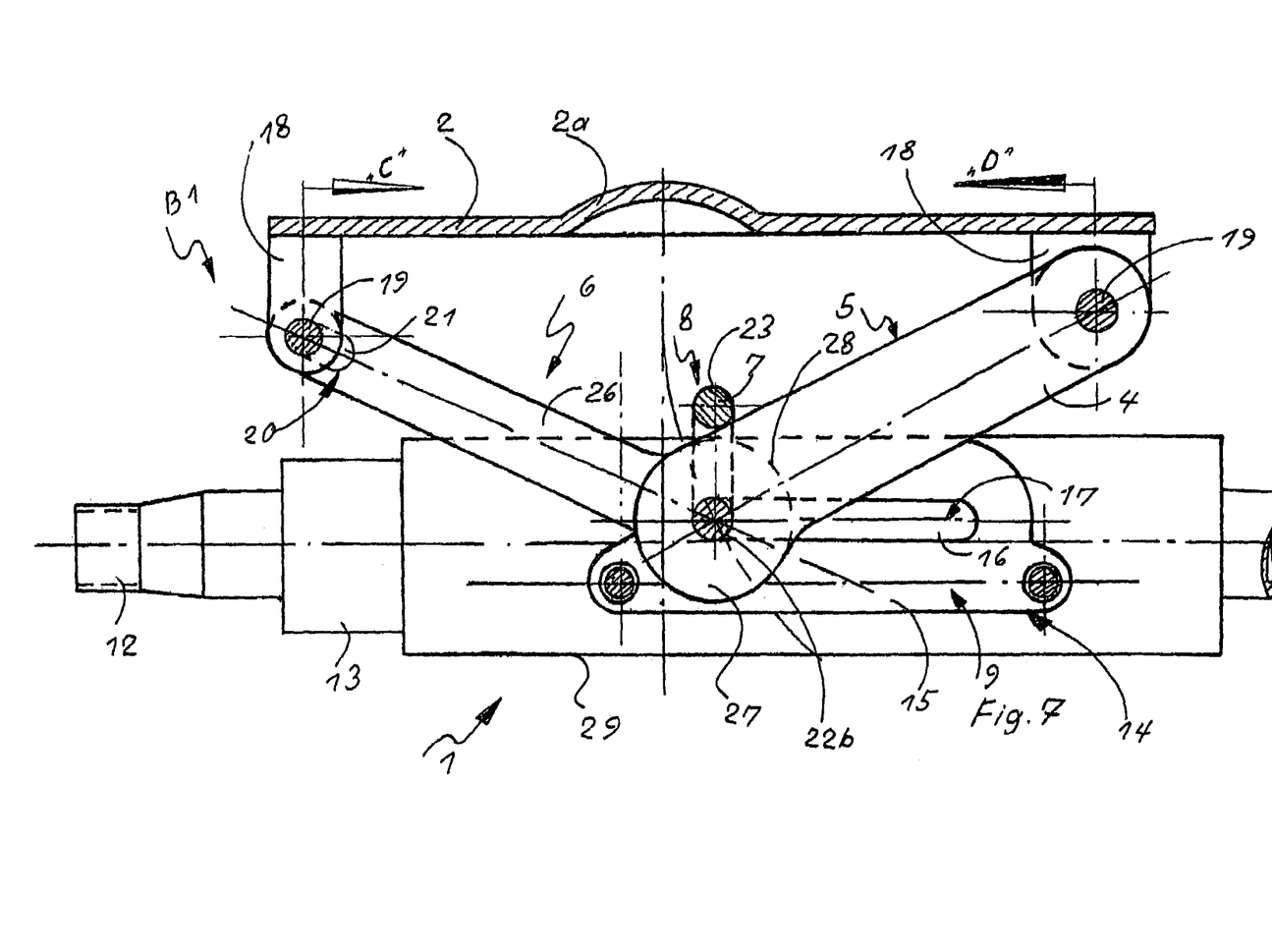
FIG. 7 shows a partially cut schematic side view of the second embodiment example of the safety device with the steering column arrangement in a lower position.
Figure 12:
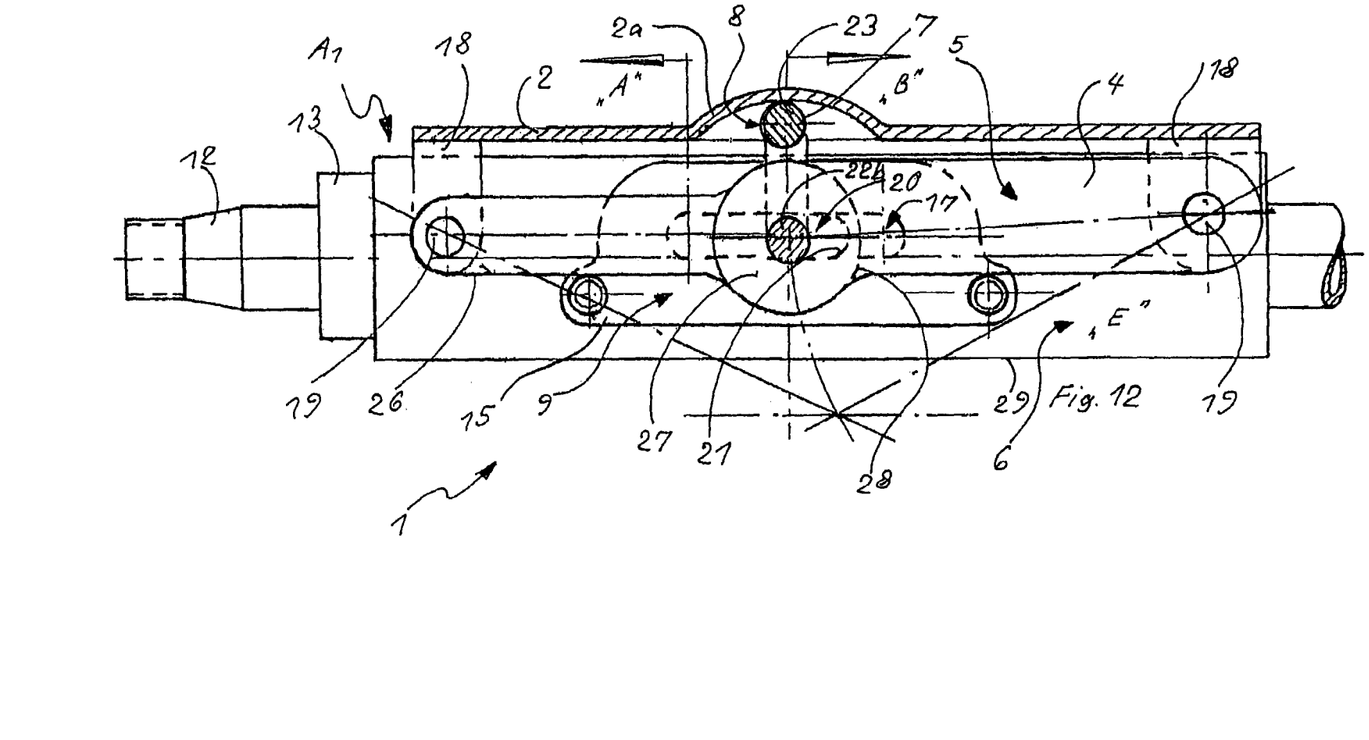
FIG. 12 shows a view which is similar to FIG. 6 of a variant of the second embodiment example of the safety device with the steering column arrangement in an upper position.

FIGS. 6 and 7 show the length compensation 20 at the end of the guide lever 26 on the side of the support block 18. FIG. 12 shows the length compensation 20 at the end of the guide lever 26 on the side of the clamping devices 14 as an additional merely exemplary embodiment variant.

The swiveling lever 4, guidance or support lever 26 and clamping plates or metal sheets 15 are mounted on both sides alternately in a sufficient number until the required clamping rigidity is achieved, in particular also for the case of a crash.

FIG. 7 shows the kinematics according to the invention in the lowest position B1 of the steering column arrangement 1 in a position away from the driver.

In the two representations of FIGS. 6 and 7, a recess 2a in the base plate 2 is clearly represented, which recess 2a serves to receive the middle section 23 of the bolt 7, in order to allow as high as possible a construction and thus to keep as much foot room in the motor vehicle (not shown) below the steering column arrangement 1 in spite of all the adjustment mechanisms or devices.

Figures 8, 9:
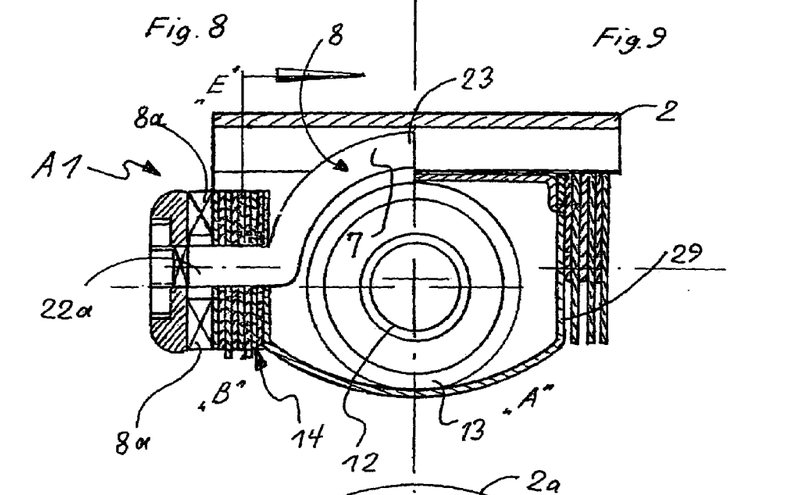
FIGS. 8–11 show schematic cross sectional views similar to the cross sectional views of FIGS. 6 and 7.

FIG. 8 shows in the cross section "B" of FIG. 6, the cross section through the clamping plate 15 of the clamping devices 14 in its middle. Also represented are industrially known clamping lugs or rolls 8a which are a component of the clamping devices 14 and which fulfill their function. The bolt 7 is bent to save space, as already described and explained above, and it is received with its middle section 23 in the local dent or recess 27 in the base plate, so that as a result of the effect of both construction embodiments (bent bolt and recess for its reception) a particularly large space is created compared to the clamping axles which are today conventionally used, and which are straight and located under the steering column arrangement 1.

Figures 10, 11:
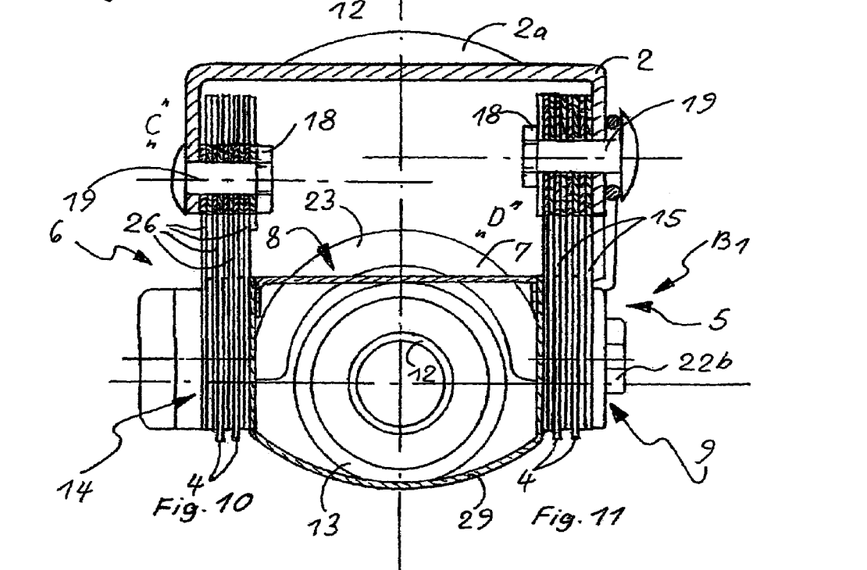
Figure 13:
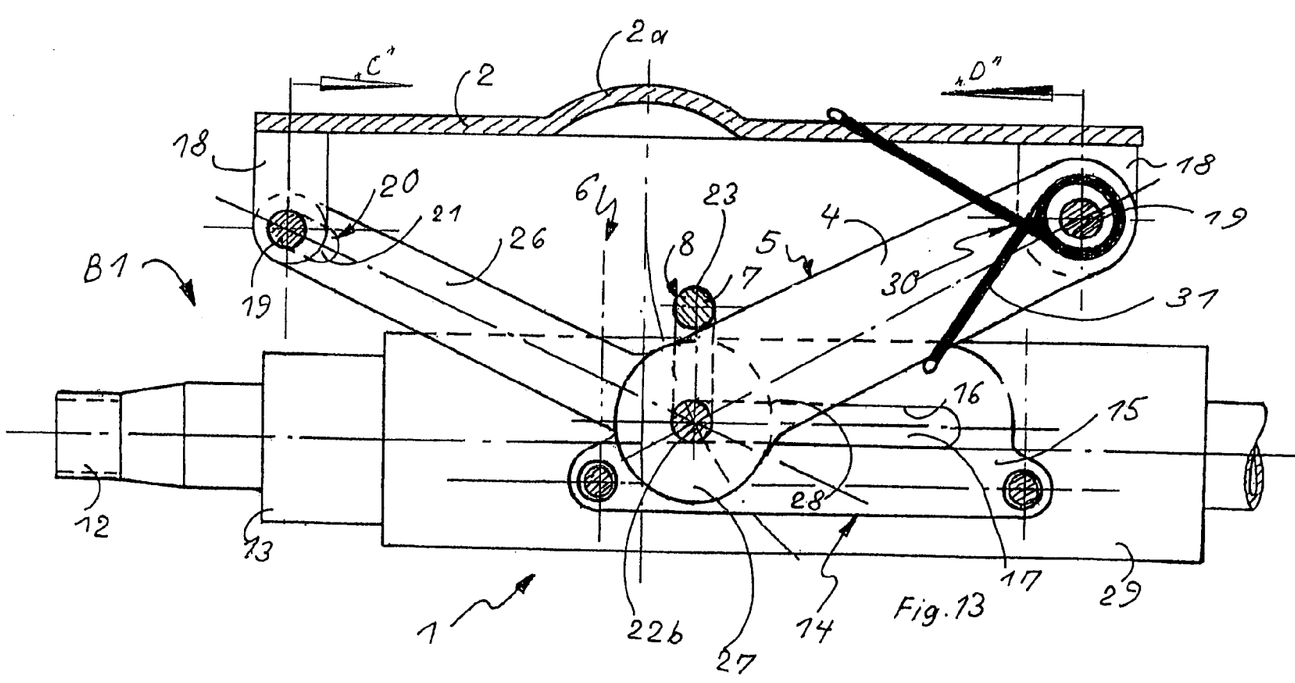
FIG. 13 shows a view analogous to FIG. 7 of a variant of the second embodiment example of the safety device with the steering column arrangement in a lower position.

FIG. 9 shows a cross section "A" of FIG. 6 through the steering column arrangement 1 and its housing 29. FIG. 10 shows, in the cross section "C" of FIG. 7, the adjustable steering or steering column arrangement 1 in its bottommost position B1, with cross section through the support block 18 on the side of the steering; FIG. 11 shows the cross section "D" through the support block 18 on the motor side, according to FIG. 7. FIG. 13 shows, as additional load removal devices 30, a space-saving flat spiral spring 31, which is, mounted parallel to the swiveling arm or lever 4.

A substantial advantage of the invention consists in that the mechanism never projects over the steering assembly and thus the knee is not injured in the crash, and more knee room is produced. This is achieved by means of swiveling arm or lever 4 which rises and falls with the height adjustment of the steering column arrangement 1. The bent clamping bolt 7 and the flat spiral spring 31, which is designed to take up little space, contribute to this purpose.

Additional advantages and preferred embodiments of the invention are:

1. The entire steering column height and length adjustment mechanism has a compact design that no longer has any projecting parts independently of the adjustment position. This is optimal for construction space and to prevent injury to the knee due to impact in case of an accident.
2. The adjustment mechanism moves with the movement of the steering column assembly.
3. For example, a clamping or bracing bolt, which is straight as conventionally used today, is led around or bent around the steering housing in such a manner that the adjustment mechanism assumes a position to the side of the steering column assembly without projecting upward or downward.
4. Swiveling arms are connected by articulation to a base plate that is connected to the car body. At the other end, the swiveling arms end as clamping plate around bracing bolts or in general the engagement devices. On this swiveling arm/these swiveling arms the steering column assembly is swiveled up and down in the form of a segment of a circle.
5. For the length adjustment of the steering assembly, adjustment plates, for example, having longitudinal slots, are attached to form a slot guidance at the steering assembly. According to the invention, the specific form and attachment of the slot guidance is such that any position of adjustment is possible—especially the upper one (see figures).
6. To further stabilize this arrangement without oscillation, it is advantageous to use guide or support arms that are attached by articulation at the other end of the base plate (see drawing). They swivel with the steering assembly up and down, and they are attached like the swiveling arms or levers at the other end to the clamping bolt. Because the support or guide levers must follow the swiveling levers, they require, for example, a slot as length compensation at least at one end.
7. As in practice today, for example with adjustment plates with vertical slots conventionally fixed on the base plate and the plates attached to the steering housing with horizontal slots, it is also preferred in the present invention to alternately nest clamping plates, swiveling levers and guide levers to form packets. In this manner it is possible, in a particularly simple manner, to achieve the required holding forces in an accident and to maintain a construction without oscillation.

8. FIG. 13 shows a flat spiral spring which can be used in the construction for load removal, and which, in the shown arrangement, does not require any additional space.

9. The bent bolt can carry out a swivel movement to apply bracing, to move the clamping mechanism (lugs or threads) which today are conventionally on both sides.

The individual embodiments of the present invention have, due to specific combinations of characteristics, in particular, the following embodiments and/or advantages.

A mechanism which provides protection for the knees against impact, or an optimized knee impact mechanism, is provided for positioning the steering column with a mechanical steering column length and height adjustment and a corresponding positioning method, which can thus also be referred to as a safety device or safety method. As a result of the invention, in particular, a steering column adjustment mechanism is created, which is located laterally beside the steering column and which does not project spatially either upward or downward, namely in any adjustment position. It is preferred for this to apply to all the positions of the steering column. In addition, the mechanism preferably takes up such little space that there is still sufficient room for an impact padding.

According to the invention, the adjustment mechanism moves with the steering column housing. In addition, solutions also exist to design the bolt for clamping so that space is saved. The same applies to a load compensation spring, which often requires its own additional space. In the mechanism for the adjustment of the steering, one thus eliminates, in particular, any crash-critical parts or parts which project downward in the direction toward the knee of a driver. Furthermore, in the mechanism, it is also possible to eliminate parts, which project upward in the direction upward the instruments. It is preferred for the mechanism to be located on one side and, in particular, on both sides laterally next to the steering column.

It is essential for these designs and advantages that swiveling arms or levers that are designed so they can swivel are provided for an upward/downward movement of the steering. The swiveling arms or levers are designed in such a manner that they achieve a functionally correct overlap for fixing of the length adjustment devices in any position of the steering adjustment, and so that they are also jointly clamped for the fixing. Here it is possible to provide, in addition, a clamping piece which is designed in such a manner that it achieves a sufficient overlapping and thus clamping of the clamping plates and swiveling levers. This clamping piece can be designed so it has the shape of a slight curvature of preferably a few hundredths of a millimeter, which results in the maximum clamping force at the individual ends.

One aspect which is also of independent inventive and patent-justifying importance consists of the fact that, for example, a clamping bolt is led in such a form around the steering column arrangement that it needs hardly any more space than its vertical thickness dimension; for this purpose the clamping bolt can be shaped in such a manner that the clamping mechanism does not require any, or hardly any, additional space beyond the thickness dimension of the clamping bolt, in all cases for the swiveling of the clamping bolt to actuate the clamping devices. As a result of the fact that the clamping bolt, to allow opening and application of bracing of the steering adjustment, can be turned and thus swiveled, the space requirement continues to be as small as possible. The bent bolt then carries out a swivel movement to apply a bracing, and, thereby in particular, it moves the clamping mechanism provided on both sides, for example by means of lugs or threads. Furthermore, it is preferred for the clamping bolt to have a rounded shape.

The safety device according to the invention for a motor vehicle with a steering or steering column arrangement is characterized in that it contains a steering column height and length adjustment mechanism in a compact design, which, irrespective of the adjustment position, no longer presents any projecting part, which is optimal for construction space and for preventing injury to the knee due to impact in an accident. The swiveling arms of the height adjustment devices, which are used here, are preferably connected by articulation to a base plate that is connected to the body of the motor vehicle. To simplify the clamping devices, one can, furthermore, provide for the guide arms to end at the other end as a clamping plate around the bracing bolt. Thereby the steering column assembly can be swiveled up and down in the form of a segment of a circle on this swiveling arm/these swiveling arms.

In the safety device according to the present invention as well, adjustment plates with longitudinal slots can be attached to the steering assembly for length adjustment of the steering assembly; here the shape and attachment of the adjustment plates can be such that, any position of adjustment, in particular an upper position, is possible. For completion, it is advantageous, because of stabilization, if guide arms or levers are provided which are attached by articulation with respect to the swiveling arms on the other end of the base plate. These guide arms or levers can swivel upward and downward with the steering assembly and/or they can be attached at the other end, like the swiveling arms or levers, in the middle of the clamping bolt. During the setting operation of the position of the steering column arrangement, the guide arms or levers will follow the swiveling arms or levers and, preferably, they will present a slot as length compensation on one end or in each case on both ends. It is preferred for the clamping plates, or also the length adjustment plates, swiveling arms and guide arms, to be nested to form a packet.

Finally, a flat spiral spring load removal can also be provided, which, in particular, does not require any additional or separate space.

By means of the present invention, in particular one achieves the advantage of a dimensionally optimized steering position adjustment. The space requirement in the upward direction toward the instruments is not greater than the thickness of the bolt or clamping bolt 7. Clamping bars in the form of the swiveling levers 4 and the clamping plates 15 are located, in each position, laterally with respect to the steering. They move together with the steering column arrangement 1. As a result, more room for the driver's knee is provided. During a crash, no knee destroying mechanism exists. Furthermore, the space, which is provided as a result of the invention, is sufficient for the attachment of an additional impact padding 11 to protect the knee during a crash. In this manner, any possible future crash safety requirements can also be satisfied.

In summary, the present invention provides a safety device with a length and height adjustment mechanism of a steering column or steering column arrangement, which safety device is designed in such a way and carried along with the movement that it requires hardly any additional space in the height dimension. In particular, in the process the clamping bolt or, in general, the engagement device during actuation, swivels, and the swiveling lever for the height adjustment moves upward and downward with the steering column arrangement.

The characteristics of the safety method for a motor vehicle with a steering [arrangement] can be obtained without any problem from the operation or the actuation of the safety device according to the invention.

The above-indicated characteristics and combination of characteristics of the embodiment example, which are represented in the drawings, merely serve as an exemplary clarification of the invention, and not as a limitation thereof. The extent of the disclosure of the entire present document is determined by what a person skilled in the art can obtain without any problem from the claims, but also from the description, the drawing and the entire contents of DE 198 44 412.5 and PCT/DE 99/01000 of the present applicant. In particular, the invention also comprises all variations, modifications and substitutions which a person skilled in the art can obtain from the entire extent of the disclosure of the present documents. In particular, all individual characteristics and embodiment possibilities of the invention and its embodiment examples can be combined.

What is claimed is:

1. Safety device for a vehicle comprising:
   a steering column arrangement;
   a longitudinal adjustment device including a slot guidance device that runs linearly in the longitudinal direction of the steering column arrangement and an engagement device, wherein the slot guidance device includes guide slots running linearly in the longitudinal direction of the steering column arrangement and on both sides of the steering column arrangement and the engagement device includes an engagement part lying on only one side of the steering column arrangement; and
   a height adjustment device including a swiveling device that engages in the engagement device of the longitudinal adjustment device, and
   wherein the engagement device has a middle section shaped about an outer contour of the steering column arrangement, and engaging ends positioned on opposite sides of the steering column arrangement.

2. Safety device according to claim 1, wherein the swiveling device contains at least one swiveling lever, which engages with one end in the engagement device of the longitudinal adjustment device and is swivellably coupled at an other end to the vehicle.

3. Safety device according to claim 1, wherein the swiveling device include a stabilization element.

4. Safety device according to claim 3, wherein the stabilization element has at least one guide lever that engages with one end in the engagement device of the longitudinal adjustment device and is swivellably linked at an other end to the vehicle, and wherein each guide lever includes an elongation compensator.

5. Safety device according to claim 1, further comprising a clamping device in engagement in the engagement device of the longitudinal adjustment device for fixation of an adjustment position of the steering column arrangement.

6. Safety device according to claim 5, wherein the clamping device includes a plurality of clamping plates, which are acuatable through the engagement device of the longitudinal adjustment device.

7. Safety device according to claim 6, further comprising a plurality of swiveling levers, wherein each swiveling lever is positioned with corresponding ends between the clamping plates for clamping of an adjustment position of the steering column arrangement by the clamping plates via the engagement device of the longitudinal adjustment device.

8. Safety device according to claim 5, wherein the clamping device includes holding devices which are actuated relative to the engagement device for actuating the clamping device.

9. Safety device according to claim 8, wherein the holding devices include one of screws, screw threads, nuts, levers and cams.

10. Safety device according to claim 5, wherein the clamping device includes a plurality of clamping plates and at least one clamping piece that is designed to have an overlap with the clamping plates.

11. Safety device according to claim 10, wherein the clamping piece is designed in a slight arc so that the maximum clamping force can be exerted at its end regions.

12. Safety device according to claim 1, wherein the engagement device, relative to the position of the steering column arrangement in the vehicle, does not project downward over the steering column arrangement.

13. Safety device according to claim 12, wherein the engagement device is passed around an upper half of the steering column arrangement.

14. Safety device according to claim 12, wherein the engagement device is swively mounted such that the engagement device actuates the clamping devices.

15. Safety device according to claim 1, wherein the engagement device is swivable from a middle position in both directions up to approximately 60°.

16. Safety device according to claim 1, wherein the engagement device is formed by a bolt that includes offsets for bringing the engagement device around the steering column arrangement.

17. Safety device according to claim 16, wherein the bolt has a circular cross section.

18. Safety device according to claim 1, wherein the longitudinal adjustment device moves together with a height adjustment of the steering column arrangement.

19. Safety device according to claim 1, wherein the longitudinal adjustment device and the height adjustment device are located laterally alongside the steering column arrangement on at least one side.

20. Safety device according to claim 1, wherein the slot guidance of the longitudinal adjustment device has at least one guide slot that is formed in an adjustment plate.

21. Safety device according to claim 1, wherein a weight-release device is provided to compensate at least partially for the weight of the steering column arrangement.

22. Safety device according to claim 21, wherein the weight-release device includes a buffer spring, which acts between the vehicle and the steering column arrangement.

23. Safety device according to claim 22, wherein the buffer spring is arranged to engage a swiveling device, on one end, and a base plate on an opposite end.

* * * * *